United States Patent
Kim et al.

(10) Patent No.: US 6,556,596 B1
(45) Date of Patent: Apr. 29, 2003

(54) APPARATUS FOR GENERATING AN OPTICAL FIBER LASER CAPABLE OF TUNING A WAVELENGTH THEREOF

(75) Inventors: Ho Young Kim, Daejon-Shi (KR); Do Il Chang, Daejon-Shi (KR); Hak Kyu Lee, Daejon-Shi (KR); Kyong Hon Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/435,301

(22) Filed: Nov. 5, 1999

(30) Foreign Application Priority Data

Nov. 18, 1998 (KR) .............................. 98-49625

(51) Int. Cl.[7] ................................................ H01S 3/30
(52) U.S. Cl. .............................. 372/6; 372/20; 372/106
(58) Field of Search ................................ 372/6, 27, 20, 372/106, 22, 32

(56) References Cited

U.S. PATENT DOCUMENTS

| | | | | |
|---|---|---|---|---|
| 3,726,584 A | * | 4/1973 | Adams ........................ | 350/147 |
| 5,287,216 A | * | 2/1994 | Chirravuri ................... | 359/341 |
| 5,347,377 A | | 9/1994 | Revelli, Jr. et al. | |
| 5,504,771 A | | 4/1996 | Vahala et al. | |
| 5,588,013 A | | 12/1996 | Reitz et al. | |
| 5,828,680 A | * | 10/1998 | Kim .............................. | 372/18 |
| 5,966,391 A | * | 10/1999 | Zediker ....................... | 372/22 |
| H1926 H | * | 12/2000 | Carruthers ................... | 375/3 |

OTHER PUBLICATIONS

K. Tamura et al., *Soliton Fiber Ring Laser Stabilization and tuning with a Broad IntracavityFilter*, Jun. 1994, pp. 697–699.

J.S. Wey et al., *Performance Characterization of a Harmonically Mode–Locked Erbium Fiber Ring Laser*, Feb. 1995, pp. 152–154.

M.C. Parker, et al., *Digitally Tunable Wavelength Filter and laser*, Aug. 1996, pp. 1007–1008.

* cited by examiner

*Primary Examiner*—Paul Ip
*Assistant Examiner*—Dung Nguyen
(74) *Attorney, Agent, or Firm*—Cohen, Pontani, Lieberman & Pavane

(57) ABSTRACT

An apparatus for generating an optical fiber laser capable of tuning a wavelength thereof. The apparatus comprises a pump laser to pump the light with changed polarization state, a light amplify fiber to produce a seed light using the pumped light from the pump laser at a certain operation wavelength and thereafter, when said seed light has stable frequency, to put out the light in that wavelength, a dispersion shift fiber to give a non-linear polarization effect to the output light from the light amplify fiber, a linear polarizer to tune the wavelength of the light from the dispersion shift fiber within a wavelength varying range, a light direction controller to give a certain oscillation direction to the tuned light, an optical element converging a light beam, with a cholesteric liquid crystal cell inserted, which transmits only a circularly polarized light having a consistent rotation period with the rotational direction of the liquid crystal surface and reflects all the rest of the light, and an output port to confirm a laser output light beam by putting out a certain portion of the light from said light converging element.

6 Claims, 2 Drawing Sheets

APPARATUS FOR GENERATING AN OPTICAL FIBER LASER CAPABLE OF TUNING A WAVELENGTH THEREOF

BACKGROUND OF THE INVENTION

1. Field of the Invention

The present invention relates to an apparatus for generating an optical fiber laser capable of tuning a wavelength thereof, and more particularly to an apparatus for generating an optical fiber laser of which the wavelength can be tuned by a cholesteric liquid crystal cell inserted into a ring type laser resonator.

2. Description of the Prior Art

In the optical communication, to transmit a mass-information with maximum utilization efficiency of the established optical lines, an optical transmission method that transmits an optical signal with varied wavelength is being used. This is called a wavelength division multiplexing (WDM) optical transmission technique.

For this transmission method, various types of light sources such as a semiconductor diode, an optical fiber laser, or a solid laser have been studied and developed worldwide, however, these sources have limited wavelength varying range and their production processes are difficult, thereby they have limited applicability.

A typical ring type laser comprises a 20 m light amplify fiber (LAF), a 60 m dispersion shift fiber (DSF) for non-linear polarization effect, a light direction controller, an optical fiber coupler for input light, a linear polarizer for wavelength tuning, and a polarization controller composed of two birefringence controllers. A 980 nm-wavelength laser diode is used for pumping, and a wavelength division optical fiber coupler is installed at an end of a light amplify fiber.

A light with a wide distribution range, produced by pumping at the light amplify fiber, is converted to a light with a resonance-capable polarization state by the linear polarizer and the birefringence occurring at the dispersion shift fiber. Thereafter, the wavelength of said oscillated light, with a resonance-capable polarization state, is changed by a birefringence controller. However, a prior ring-type laser resonator has a problem that the applicable wavelength range of the light for the birefringence controller is limited. (C in FIG. 3)

Therefore, it is difficult to transmit mass information through a limited optical line and costly to transmit information.

SUMMARY OF THE INVENTION

To solve the problems that the wavelength tunable range of the prior art is narrow and the production procedure is difficult, it is therefore the object of the present invention to provide a wavelength tunable optical fiber laser, which is able to enlarge the wavelength tunable range of an oscillated laser by increasing the gain variance in a resonator by inserting a cholesteric liquid crystal converging element into a ring type laser resonator.

To achieve the object, an apparatus for generating an optical fiber laser capable of tuning a wavelength thereof in accordance with the present invention comprises a pump laser to pump the light with changed polarization state, a light amplify fiber to produce a seed light using the pumped light from the pump laser at a certain operation wavelength and thereafter, when the seed light has stable frequency, to put out the light in that wavelength, a dispersion shift fiber to give a non-linear polarization effect to the output light from the light amplify fiber, a linear polarizer to tune the wavelength of the light from the dispersion shift fiber within a wavelength varying range, a light direction controller to give a certain oscillation direction to the tuned light, a optical element converging a light beam, with a cholesteric liquid crystal cell inserted, which transmits only a circularly polarized light having a consistent rotation period with the rotational direction of the liquid crystal surface and reflects all the rest of the light, and an output port to confirm a laser output light beam by putting out a certain portion of the light from the light converging element.

BRIEF DESCRIPTION OF THE DRAWINGS

The above object and other advantages of the present invention will become more apparent by describing in detail the preferred embodiment of the present invention with reference to the attached drawings in which.

Similar reference characters refer to similar parts in the several views of the drawings.

DETAILED DESCRIPTION OF THE PREFERRED EMBODIMENT

Referring to appended drawings, detailed description of the present invention is now described.

Figure 1:
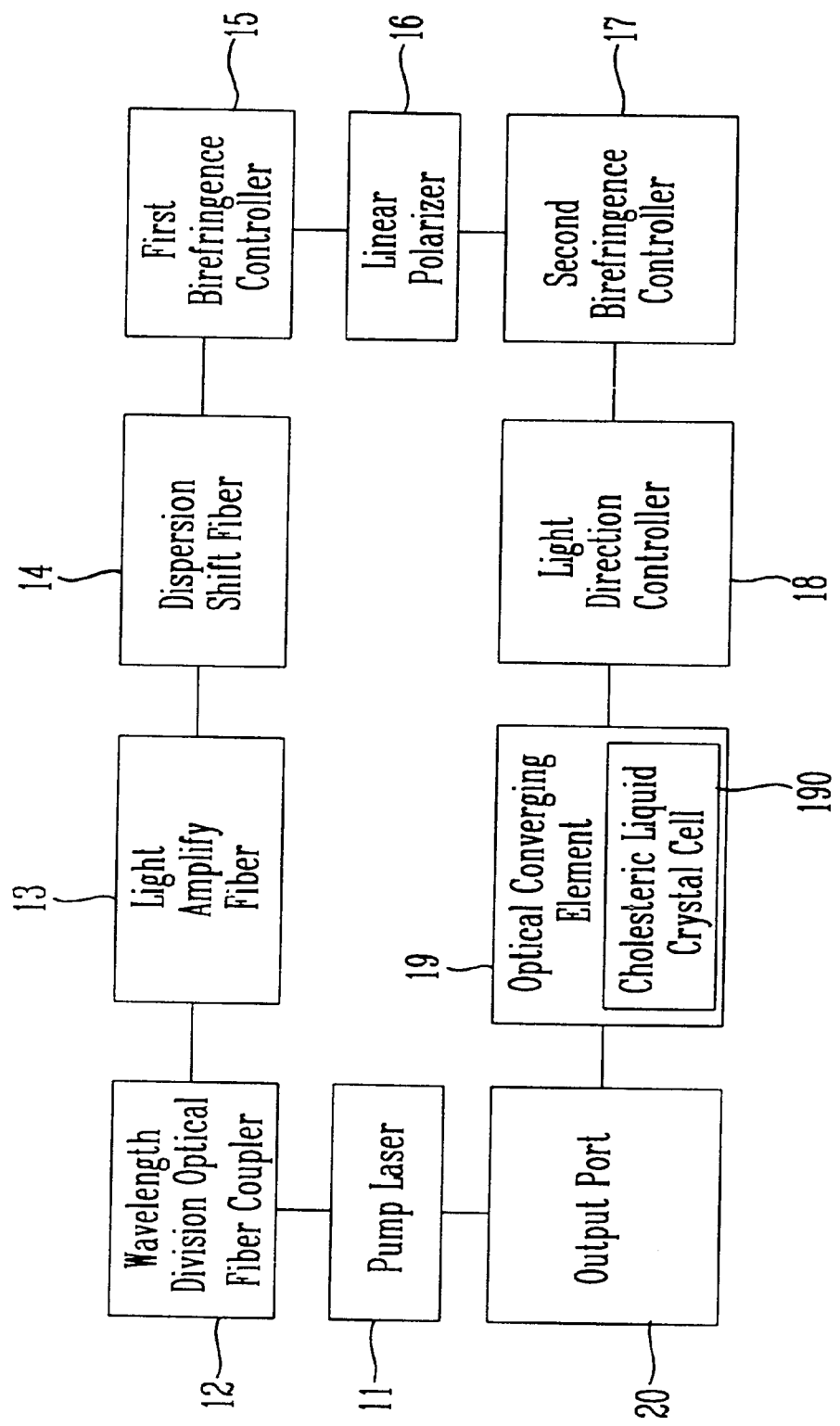
FIG. 1 is an overall schematic diagram of an apparatus for generating an optical fiber laser capable of tuning a wavelength thereof in accordance with the present invention.

FIG. 1 is an overall schematic diagram of an apparatus for generating an optical fiber laser capable of tuning a wavelength thereof in accordance with the present invention.

Referring to an embodiment of the present invention, a pump laser 11 pumps a light source using a 980 nm wavelength laser diode, the emitted light passes through a wavelength division optical fiber coupler 12, and thereafter it is converted to a light with a wide distribution range in a light amplify fiber 13. A light amplify fiber 13 produces a seed light at the wavelength of 1550 nm. For a sample, a light amplify fiber is 20 m. Thereafter, the characteristics of the light such as its refraction index are changed in a dispersion shift fiber 14 for non-linear polarization effect. For a sample, a dispersion shift fiber 14 is 60 m. The polarization state of the light is thereafter changed by the refraction index control in the first birefringence controller 15. For wavelength tuning, a linear polarizer 16 extract a light with a resonance-capable polarization state among the incoming light and the wavelength tunable range is 1550+30 nm. The second birefringence controller 17 changes the wavelength of the oscillated light with a resonance-capable polarization state. A light direction controller 18 controls the oscillated light to maintain a consistent direction. The light thereafter incidents to a cholesteric liquid crystal cell 190 installed in an optical converging element 19. The cholesteric liquid crystal cell 190 installed in an optical converging element 19 generally means a liquid crystal cell that contains cholesterol in its liquid crystal molecule. The liquid crystal cell is a liquid crystal in which an electromagnetic polarential direction of the crystal surface, which is formed by the molecular structure of the cholesteric liquid crystal cell 190, rotates left-handedly or right-handedly. In case that a light incidents perpendicularly to this liquid crystal surface, it transmits only a circularly polarized light having a consistent rotation period with the rotational direction of the liquid crystal surface and reflects all the rest of the light. By this characteristic, the liquid crystal can be used as a circular polarizer. Inserting a light converging element containing the cholesteric liquid crystal cell into a ring type laser resonator, thereby increasing the gain variance in a resonator, a wavelength tunable optical fiber laser having enlarged wavelength tunable range can be obtained.

To confirm the wavelength of the oscillated light and the gain of the wavelength tunable laser, some portion of the total output light, about 10% for example, is extracted and checked in an output port 20. The oscillated light is then recycled to the light amplify fiber 13 through the pump laser 11 and the wavelength division optical fiber coupler 12. The wavelength tunable optical fiber laser repeats above mentioned loop, thereafter when its wavelength has a stable value, comes out through the light amplify fiber 13.

Figure 2:
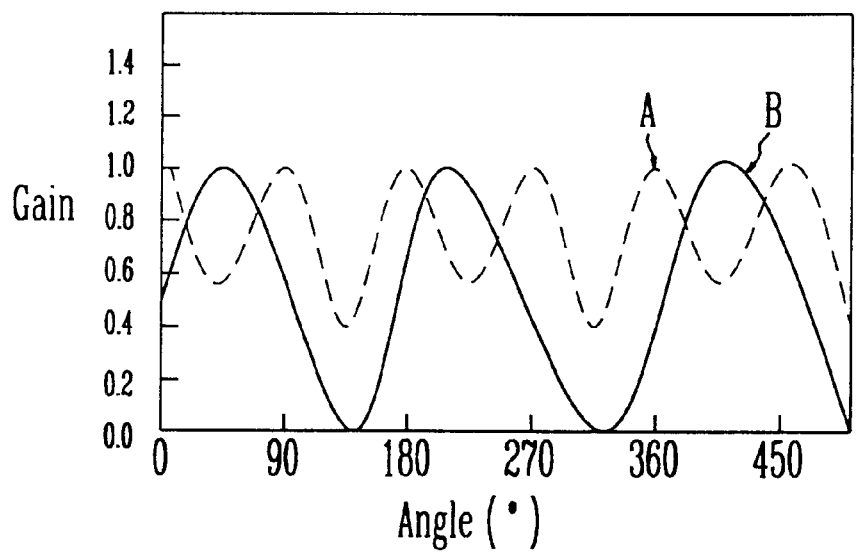
FIG. 2 is a graph illustrating the variation of the resonator gain along with the refraction angle of the birefringence controller.
Figure 3:
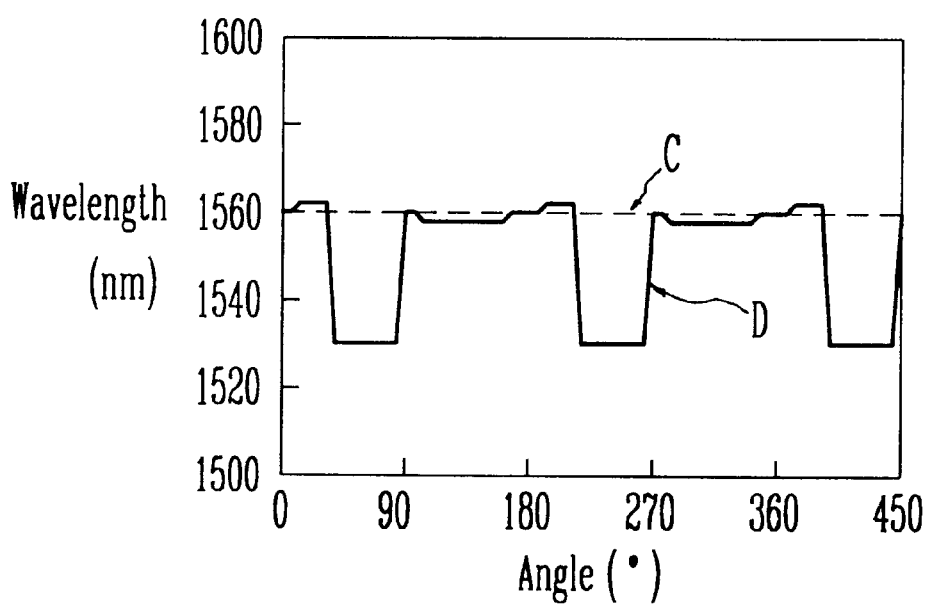
FIG. 3 is a graph illustrating the wavelength variation of the laser along with the refraction angle of the birefringence controller.

FIG. 2 is a graph illustrating the variation of the resonator gain along with the refraction angle of the birefringence controller. And FIG. 3 is a graph illustrating the wavelength variation of the laser along with the refraction angle of the birefringence controller.

In case of inserting a circular polarizer into a ring type resonator, the resonator gain variation (B in FIG. 2) along with the refraction angle of the birefringence controller is twice as much as the gain variation of the prior resonator (A in FIG. 2). The enlargement of the gain variation also causes the enlargement of the variation of the polarization state and wavelength of the laser light, thereby the wavelength of the light can be varied more widely in the same resonator structure and the same birefringence controller (D in FIG. 3).

Since those having ordinary knowledge and skill in the art of the present invention will recognize additional modifications and applications within the scope thereof, the present invention is not limited to the embodiments and drawings described above.

According to the present invention, a wavelength tunable optical fiber laser can produce a laser (a continuous wave or a mode-locked pulse type laser) having about 30 nm wavelength tunable range. The laser light source, which has a simple structure and has a wide wavelength tunable range compared with the prior laser, can be used as one of the important core-parts in the mass optical communication, thereby raise its economic competence by reducing the cost.

What is claimed is:

1. An apparatus for tuning the wavelength of light generated by an optical fiber laser; said apparatus comprising:

a pump laser to pump said light with a changed polarization state, and having an output of said light with a changed polarization state;

a wavelength division optical fiber coupler adapted to receive said output of said pump laser, and which divides said output of said pump laser into first and second portions of said light having different wavelengths;

a light amplifying fiber adapted to receive said first and second portions of said light and to produce a seed light using one of said first and second portions of said light output, from said wavelength division optical fiber coupler at a predetermined operational wavelength and above, when said seed light has a stable frequency, to output one of said first and second portions of said light at said predetermined wavelength and above;

a dispersion shifted fiber to impart a non-linear polarization effect to said said seed light from said light amplifying fiber, thereby creating an output;

a first birefringence controller to receive said output of said dispersion shifted fiber and change said polarization state of said output of said dispersion shifted fiber, and thereby produce an output;

a linear polarizer to tune said wavelength of said light output from said first birefringence controller within a wavelength tunable range, and thereby produce a tuned light output;

a second birefringence controller coupled to receive said output of said linear polarizer, and adapted to change the wavelength of said tuned light output from said linear polarizer with a resonance-capable polarization state, and create thereby an output;

a light direction controller coupled to receive said output of said second birefringence controller, and adapted to impart a predetermined oscillation direction to said light output from said second birefringence controller, thereby creating an output;

an optical element adapted to receive said output of said light direction controller, for converging said output light direction controller, said optical converging element having a cholesteric liquid crystal cell said optical converging element transmitting only that part of said output birefringence controller received by said optical element and having a circularly polarized light having a rotation period consistent with the rotational direction of the surface of said liquid crysta and reflecting all the rest of said output of said light direction controller; and an output port to confirm characters of said light generated by said optical fiber laser by outputting a portion of said part of said light output by said optical converging element.

2. The apparatus as claimed in claim 1, wherein said pump laser uses a 980 nm laser diode.

3. The apparatus as claimed in claim 1, wherein the operational wavelength of said light amplifying fiber is 1550 nm.

4. The apparatus as claimed in claim 1, wherein said light amplifying fiber is 20 m.

5. The apparatus as claimed in claim 1, wherein said dispersion shifted fiber is 60 m.

6. The apparatus as claimed in claim 1, wherein said wavelength tunable range is 1550±30 nm.

* * * * *